United States Patent [19]

Iwasaki

[11] 4,414,668
[45] Nov. 8, 1983

[54] APPARATUS FOR REPRODUCING INFORMATION SIGNALS RECORDED ON A RECORDING MEDIUM

[75] Inventor: Yoshiki Iwasaki, Yokohama, Japan

[73] Assignee: Victor Company of Japan, Ltd., Yokohama, Japan

[21] Appl. No.: 279,819

[22] Filed: Jul. 2, 1981

[30] Foreign Application Priority Data

Jul. 3, 1980 [JP] Japan .................................. 55-90020

[51] Int. Cl.$^3$ .......................... G06F 11/10; H04N 5/80
[52] U.S. Cl. ...................................... 371/38; 358/336; 369/50; 371/5
[58] Field of Search ...................... 371/38, 5; 358/342, 358/314, 327, 336; 369/47, 48, 50, 111; 360/38.1, 53

[56] References Cited

U.S. PATENT DOCUMENTS

| | | | |
|---|---|---|---|
| 3,662,353 | 5/1972 | Chertok | 369/59 |
| 3,736,582 | 5/1973 | Norris | 340/174.1 H |
| 3,882,540 | 5/1975 | Ottesen | 360/39 |
| 4,003,086 | 1/1977 | Larsen et al. | 360/53 |
| 4,021,852 | 5/1977 | Hurst et al. | 360/38.1 |
| 4,161,753 | 7/1979 | Bailey et al. | 358/336 |
| 4,203,134 | 5/1980 | Christopher et al. | 358/336 |
| 4,309,721 | 1/1982 | Christopher | 371/38 |
| 4,327,431 | 4/1982 | Dieterich et al. | 358/342 |
| 4,363,117 | 12/1982 | Wine | 358/342 |
| 4,364,119 | 12/1982 | Gibson | 360/38.1 |

FOREIGN PATENT DOCUMENTS 7112342 3/1972 Netherlands .
7613017 5/1977 Netherlands .
7807652 1/1979 Netherlands .

OTHER PUBLICATIONS

IEEE Spectrum, vol. 16, No. 12, Dec. 1979, New York (U.S.), Bernhard: "High Fi by Digits", pp. 28-32.

Primary Examiner—Charles E. Atkinson
Attorney, Agent, or Firm—Louis Bernat

[57] ABSTRACT

An apparatus for reproducing information signals recorded on a recording medium comprising a pickup transducer for picking up a recorded signal from an information signal recording medium in which an analog information signal is successively recorded in units of a plurality of data blocks, the data block having a train of digital signals obtained by digitally modulating the analog information signal, error correcting words, and an error detection word, a frequency characteristic regulation circuit for regulating the frequency characteristic of the signal picked up from the information signal recording medium by the pickup transducer, an error detection circuit for detecting whether an error exists in the data block of a signal which has passed through the frequency characteristic regulation circuit, by use of the error detection word, and a control circuit for controlling the frequency characteristic regulation circuit to vary the frequency characteristic according to an output of the error detection circuit.

7 Claims, 4 Drawing Figures

APPARATUS FOR REPRODUCING INFORMATION SIGNALS RECORDED ON A RECORDING MEDIUM

BACKGROUND OF THE INVENTION

The present invention generally relates to apparatuses for reproducing information signals recorded on a recording medium, and more particularly to a reproducing apparatus which has a circuit for regulating the frequency characteristic so that number of errors in the reproduced data block is reduced, when reproducing the information signals from a recording medium on which the information signals are recorded as blocks of digital signals.

Recently, methods have been realized in which a train of digital signals is obtained by digitally modulating an information signal such as an audio signal, the train of digital signals is encoded by use of a predetermined modulating system, and the train of digital signals thus encoded is frequency modulated to record the information signal as a variation in geometrical configuration such as pits on a rotary recording medium (hereinafter simply referred to as a disc), and then to reproduce the above information signal.

However, there are cases where errors are introduced in the reproduced signal, upon reproduction of the information signal from the above disc in which the information signal is recorded. When these errors exist, noise is introduced in the reproduced sound which is obtained by converting the above reproduced signal into an analog signal. Accordingly, the reproduced sound thus obtained in this case is of a low quality, and unpleasant to the ear.

The errors introduced in the above reproduced signal are mainly due to causes such as deformation in the configuration and depth of pits of the disc introduced in a manufacturing process of the disc, and undesirable deviation from the standard value in the electrode configuration of a reproducing stylus of a reproducing apparatus and in the mounting direction of the reproducing stylus. Moreover, degradation is introduced in the reproduced frequency characteristic at the inner peripheral part of the disc, since the relative scanning linear velocity between the reproducing stylus and the disc decreases as the reproducing stylus moves towards the inner peripheral part of the disc from the outer peripheral part of the disc. Therefore, the above described errors are also introduced due to the degradation in the above frequency characteristic.

To describe the above in a more detailed manner, in general, in an audio disc in which the bit rate of the train of digital signals is relatively high, namely six Mbit/second, for example, the band of the frequency spectrum of the recorded signal is wide. Accordingly, when a signal having such a wide frequency spectrum is frequency modulated, a high signal-to-noise (S/N) ratio cannot be obtained, since the modulation index decreases especially in the high frequency range components.

On the other hand, in the above described type of a disc, the signal reproduced from the disc is generally reproduced by always maintaining the rotational speed of the disc at a constant value, regardless of the reproducing position of the pickup stylus. Hence, the relative linear velocity between the reproducing stylus and the disc at the inner peripheral part of the disc is lower than that at the outer peripheral part of the disc. Accordingly, the level of the high frequency range components decreases as the reproducing stylus reproduces the inner peripheral part of the disc, since the modulation index in the high frequency range components decreases as described above, and since the relative linear velocity between the reproducing stylus and the disc is low at the inner peripheral part of the disc. Especially in the inner peripheral part of the disc, the carrier-to-noise (C/N) ratio of the frequency-modulated signal decreases. Furthermore, the level of the reproduced signal decreases especially in the high frequency range components with respect to the level of the original signal.

Accordingly, in the conventional reproducing apparatus, distortion is introduced in the output of the demodulator, due to the decrease in the level of the high frequency range components. As a result, it becomes difficult to discriminate the data, and code errors are accordingly introduced. Therefore, in the conventional apparatus, there was a disadvantage in that the information signal could not be reproduced accurately throughout the entire disc.

As described above, the relative linear velocity between the reproducing stylus and the disc at the inner peripheral part of the disc is lower than that at the outer peripheral part of the disc. Hence, in order to reproduce the information signal under the same condition throughout the entire disc, the length of the pits along the rotational direction of the disc must be formed so that the pits are shorter at the inner peripheral part of the disc compared to the pits formed at the outer peripheral part of the disc.

Upon manufacturing of the disc, the pits are unlikely to be formed sharply at the peripheral edge portions of the pits, due to limitations in the accuracy of the beam upon irradiation to form these pits, and the like. Thus, it is difficult to form rows of pits having a short length, with high accuracy, at the inner peripheral part of the disc. Hence, when the signal waveform having a sinusoidal wave shape obtained by wave-shaping the signal reproduced by the reproducing stylus in an equalizer and the like is examined, the reproduced waveform obtained from the pit at the outer peripheral part of the disc is normal while the reproduced waveform obtained from the pit at the inner peripheral part of the disc is distorted, for exactly the same signal, for example. This distortion in the reproduced waveform is introduced since the reproduced signal level obtained from a pit at the inner peripheral part of the disc decreases especially in the high frequency range, in addition to the above described causes.

Therefore, in the conventional reproducing apparatus, carrier leak is introduced in the output of the demodulator due to the above distortion in the waveform. As a result, it becomes difficult to discriminate the data, and code errors are introduced. Hence, there was a disadvantage in that the information signal could not be accurately reproduced throughout the entire disc.

The above errors introduced in the reproduced signal can be reduced by suitable adjusting or regulating the frequency characteristic of the reproducing apparatus. Accordingly, the present invention was matured by taking this point into consideration.

SUMMARY OF THE INVENTION

Accordingly, a general object of the present invention is to provide a novel and useful apparatus for reproducing information signals recorded on a recording medium which is capable of reducing the generation of the above described errors.

Another and more specific object of the present invention is to provide a reproducing apparatus which is constructed to vary the frequency characteristic according to a detected output obtained by detecting the number of errors generated in the reproduced signal.

Other objects and further features of the present invention will be apparent from the following detailed description when read in conjunction with the accompanying drawings.

DETAILED DESCRIPTION

Figure 1:
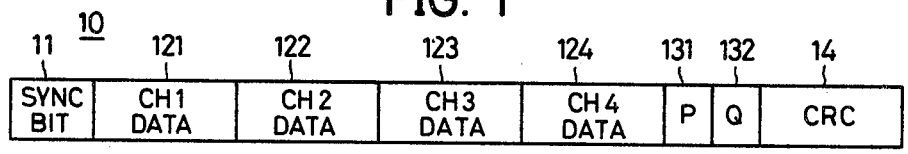
FIG. 1 is a diagram for explaining an example of a construction of a data block.

In a case where the information signal which is recorded on the disc is a four-channel audio signal, this audio signal is digitally modulated every predetermined period by a modulation method such as a pulse-code-modulation (PCM). The train of digital signals thus obtained is arranged as indicated by 121 through 124 in FIG. 1, and error correcting words P and Q which are respectively produced from the above data 121 through 124 according to a predetermined logical operation equation are respectively arranged as indicated by 131 and 132. Furthermore, a cyclic redundancy check code (CRC) 14, which is a redundance obtained when the above data 121 through 124 and the error correcting words P and Q are divided by a predetermined generation polynominal, is arranged as shown in FIG. 1. In addition, a synchronizing bit 11 which indicates the beginning of a data block, is arranged at a position at the beginning of the data block before the above data, the error correcting words, and the CRC. Accordingly, a data block 10 shown in FIG. 1 is thus constructed by these data, error correcting words, CRC, and the synchronizing bit. The information signal is successively composed in a time series manner every unit of a plurality of data blocks, and then encoded by use of a modulation system such as a modified frequency modulation (MFM), phase encoding (PE), and three position modulation (3PM). The modulated signal is then recorded onto the disc by frequency modulating a carrier wave having a high frequency, by considering the interchangeability between a video disc in which the main information signal is a video signal.

Figure 2:
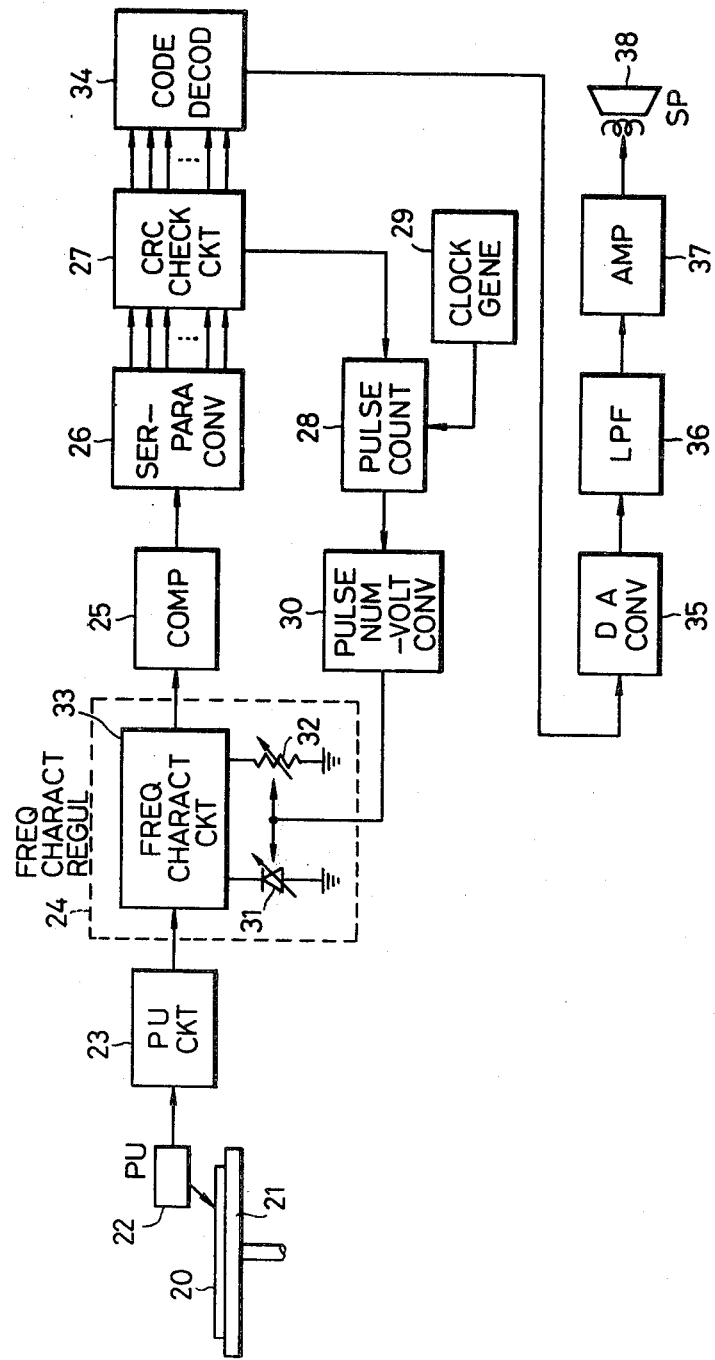
FIG. 2 is a systematic block diagram showing an embodiment of a reproducing apparatus according to the present invention.

FIG. 2 is a systematic block diagram showing an embodiment of an apparatus for reproducing signals from a disc in which a signal such as the above described signal is recorded. The recorded signal is picked up (reproduced) from a disc 20 which is placed onto a turntable 21 and rotated, by use of an electrostatic capacitance type system, for example, by a pickup cartridge 22. The signal thus picked up by the pickup cartridge 22 passes through a pickup circuit 23, and is then supplied to a frequency characteristic regulation circuit 24. The frequency characteristic is regulated as will be described hereinafter, by the frequency characteristic regulation circuit 24.

The signal which has passed through the frequency characteristic regulation circuit 24 is supplied to a comparator 25 wherein the sinusoidal wave is converted into a square wave. The output square wave signal produced by the comparator 25, is supplied to a serial-to-parallel converter 26 wherein the signal is converted into a parallel signal, and then supplied to a CRC checking circuit 27. The CRC checking circuit 27 performs a predetermined arithmetic operation between the signal supplied thereto and the CRC of the error detection word within the reproduced square wave signal, and detects whether the data block including the above CRC is correct or not. In a case where the data is in error, the whole data block is discarded, and an error signal is applied to a pulse counter 28.

The pulse counter 28 is constructed so as to perform a counting operation every unit of time (normally, ten miliseconds to one second), by a clock pulse supplied from a clock pulse generator 29. The number of error signals per unit time, is supplied to a pulse number-voltage converter 30 from the pulse counter 28. Accordingly, a voltage having a level respective of the number of pulses, that is, the number of error signals generated, is formed at the pulse number-voltage converter 30. Moreover, the pulse number-voltage converter 30 is constructed so that the output voltage becomes a predetermined value when the input pulse number (number of pulses) becomes zero.

The output voltage of the pulse number-voltage converter 30 is applied to a variable-capacitance diode 31 and an electronic attenuator 32 which are respectively connected to a frequency characteristic circuit 33 within the frequency characteristic regulation circuit 24. The capacitance of the variable-capacitance diode 31 is varied in accordance with a voltage applied thereto, and the frequency characteristic of the circuit comprising the variable-capacitance diode 31 and the frequency characteristic circuit 33 which is connected to the variable-capacitance diode 31 is varied accordingly. In addition, the resistance of the electronic attenuator 32 is varied according to the voltage applied thereto, and varies the level of the frequency characteristic of the signal which passes through the frequency characteristic circuit 33.

Therefore, the frequency characteristic of the reproduced signal from the disc 20 is regulated by the frequency characteristic regulation circuit 24 into a frequency characteristic which is most suited for the square wave converting operation of the comparator 25 at the following stage. That is, the frequency characteristic is regulated so that the number of generated error detected signals obtained from the CRC checking circuit 27 is reduced to a number close to zero.

The above described frequency characteristic regulation circuit 24, the comparator 25, the serial-to-parallel converter 26, the CRC checking circuit 27, the pulse counter 28, and the pulse number-voltage converter 30 construct a closed loop circuit which operates to reduce the number of error signals generated due to the CRC checking operation to a minimum value (theoretically zero).

On the other hand, the output signal of the CRC checking circuit 27 is supplied to a code decoder 34. In a case where it is detected that no errors exist in the data block by the CRC checking circuit 27, the reproduced data block (square wave) which is encoded by a modulation method such as the MFM, is decoded by the code decoder 34 and converted into the original train of digital signals. Then, the above train of digital signals obtained from the code decoder 34 is converted into an analog signal (a four-channel audio signal in the case of the present embodiment of the invention) by a digital-to-analog (D/A) converter 35.

The above analog signal thus obtained, that is, the audio signal, is supplied to a low-pass filter 36 wherein the unwanted high frequency components are eliminated, and returned into the original audio signal. This original audio signal is supplied to a speaker 38 through an amplifier 37, and sound is accordingly generated.

In a case where it is detected that an error exists in the data block by the CRC checking circuit 27, the data block which is detected as having an error is discarded at the code decoder 34. However, the data within the data block which is detected as having an error, can be restored by performing an arithmetic operation between the error correcting words P and Q and the other data within that data block. This error correcting operation itself is already known, and therefore, a detailed description of this error correcting operation will be omitted.

In the above embodiment of the invention, the serial-to-parallel converter 26 can be provided at a stage following the CRC checking circuit 27.

Next, description will be given with respect to another embodiment of the frequency characteristic regulation circuit 24.

Figure 3:
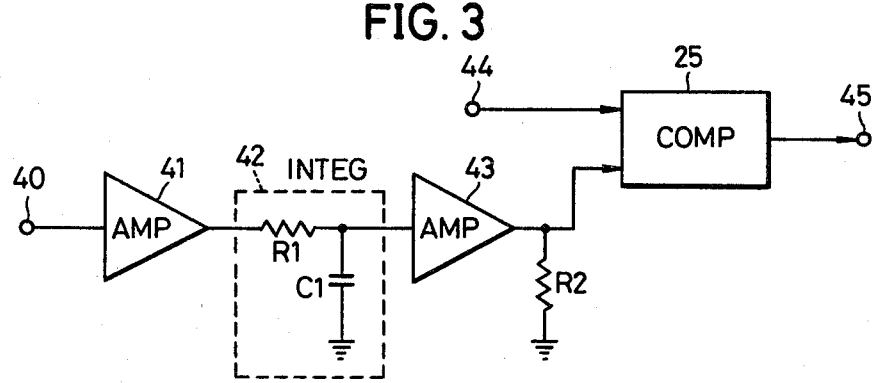
FIGS. 3 and 4 are a systematic circuit diagrams respectively showing respective different embodiment of a frequency characteristic regulation circuit used in the block system shown in FIG. 2.

In FIG. 3, the output signal of the pulse number-voltage converter 30 shown in FIG. 2 is applied to a terminal 40. The signal from the above terminal 40 is supplied to an integration circuit 42 having a resistor R1 and a capacitor C1, through a buffer amplifier 41, and the DC level of the signal is detected at the integration circuit 42. The output voltage of the integration circuit 42 is applied to the comparator 25 through a gain amplifier 43, to vary the comparing reference voltage of the comparator 25. The signal from the pickup circuit 23 is supplied to the other input terminal of the comparator 25 through a terminal 44.

When the pickup cartridge 22 scans the inner peripheral part of the disc 20, for example, the waveform of the signal which is picked up from the disc is distorted, since the relative linear velocity between the reproducing stylus and the disc decreases at the inner peripheral part of the disc as described above. Accordingly, when this kind of a distortion is introduced in the waveform picked up from the disc 20, a square wave of a non-symmetrical waveform is obtained when the waveform thus picked up is converted into a square wave as it is, to produce a waveform in which the duty cycle is not 50%. Therefore, errors are introduced in the data of the reproduced signal.

However, in the present embodiment of the invention, the comparing reference voltage of the comparator 25 is varied according to the number of errors generated. Hence, even when the waveform of the signal picked up from the disc 20 is distorted, the reference level used to convert the above signal into a square wave is varied in accordance with the above distortion in the picked up signal. Accordingly, a square wave having a duty cycle of 50% is always obtained from the comparator 25, and regulation is performed to regulate the generation of errors in the data of the reproduced signal.

Figure 4:
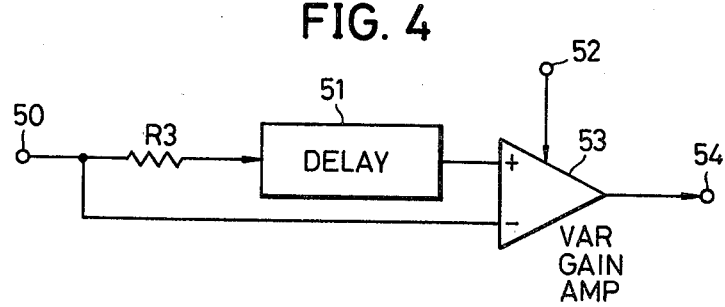

In an embodiment shown in FIG. 4, the signal supplied from the pickup circuit 23 is supplied to an inverting input terminal of a variable gain amplifier 53 having an operational amplifier, through a terminal 50. On the other hand, this signal obtained through the terminal 50 is also supplied to a non-inverting input terminal of the variable gain amplifier 53 through a resistor R3 and a delay circuit 51 having a delay time of $\tau$. The variable gain amplifier 53 is applied with the output of the pulse number-voltage converter 30 through a terminal 52, and varies the gain. The present embodiment of the invention as a whole constructs a cosine equalizer, in which the transfer function $H(\omega)$ is described by an equation $H(\omega) = 1 - K \cos \omega\tau$, where K is a gain varying constant.

The output level of the cosine equalizer obtained through an output terminal 54 increases especially at the high frequency range side, within a range between frequencies $1/(4\tau)$ and $1/(2\tau)$, as the voltage applied from the terminal 52 increases, that is, as the value of the gain varying constant K increases.

Accordingly, in a case where errors are introduced as the output level decreases especially at the high frequency range side when the signal is picked up from the inner peripheral part of the disc, for example, the characteristic at the high frequency range side is improved in order to prevent the introduction of errors. Moreover, the signal obtained through the terminal 54 is supplied to the comparator 25.

Further, this invention is not limited to these embodiments but various variations and modifications may be made without departing from the scope of the invention.

What is claimed is:

1. An apparatus for reproducing information signals recorded on a recording medium, said apparatus comprising:

pickup means for picking up a recorded signal from the recording medium on which an analog information signal is successively recorded in units of a plurality of data blocks, each of said data blocks having a train of digital signals obtained by digitally modulating the analog information signal, error correcting words, and an error detection word;

frequency characteristic regulation means for regulating the frequency characteristic of the signal picked up from said recording medium by said pickup means;

error detection means for detecting whether an error exists in the data block of a signal which has passed through said frequency characteristic regulation means, by use of said error detection word; and control means for controlling said frequency characteristic regulation means to vary the frequency characteristic according to an output of said error detection means.

2. An apparatus for reproducing information signals recorded on a recording medium as claimed in claim 1 in which said control means has counting means for counting the number of detected output errors of said error detection means, and control voltage generation means for generating a control voltage which is representative of an output of said counting means, said control voltage generated by said control voltage generation means being applied to said frequency characteristic regulation means to vary the frequency characteristic.

3. An apparatus for reproducing information signals recorded on a recording medium as claimed in claim 2 in which said counting means has a clock pulse generator for generating a clock pulse, and a pulse counter for counting the number of detected errors obtained by said counting means every unit of time by use of the clock pulse supplied from said clock pulse generator, said control voltage generation means having a pulse number-voltage converter for generating a voltage representative of an output pulse number supplied from said pulse counter.

4. An apparatus for reproducing information signals recorded on a recording medium as claimed in claim 1 in which said frequency characteristic regulation means has a frequency characteristic circuit, and a variable-capacitance diode connected to said frequency characteristic circuit, the capacitance of said variable-capacitance diode being varied according to a voltage applied from said control means.

5. An apparatus for reproducing information signals recorded on a recording medium as claimed in claim 4 in which said frequency characteristic regulation means further includes a resistance circuit, connected to said frequency characteristic circuit, for varying the level of a signal which passes through said frequency characteristic circuit by varying the resistance of said resistance circuit according to a voltage applied by said means.

6. An apparatus for reproducing information signals recorded on a recording medium as claimed in claim 1 which further comprises a comparator for converting the signal picked up by said pickup means into a square wave, said frequency characteristic regulation means having a circuit for varying an operational reference voltage of said comparator according to an output of said control means.

7. An apparatus for reproducing information signals recorded on a recording medium as claimed in claim 1 in which said frequency characteristic regulation means has a delay circuit, supplied with the signal picked up by said pickup means, and a variable gain amplified, said variable gain amplifier including inverting and non-inverting input terminals and said inverting input terminal being supplied with the signal picked up by said pickup means and said non-inverting input terminal being supplied with an output signal of said delay circuit, said variable gain amplifier having a gain which is varied according to an output of said control means.

* * * * *

UNITED STATES PATENT AND TRADEMARK OFFICE
CERTIFICATE OF CORRECTION

PATENT NO. : 4,414,668

DATED : November 8, 1983

INVENTOR(S) : YOSHIKI IWASAKI

It is certified that error appears in the above-identified patent and that said Letters Patent is hereby corrected as shown below:

Column 8, line 15, change "amplified" to --amplifier--.

Signed and Sealed this

Twentieth Day of March 1984

[SEAL]

Attest:

GERALD J. MOSSINGHOFF

Attesting Officer     Commissioner of Patents and Trademarks